(12) United States Patent
Stout, II et al.

(10) Patent No.: US 11,110,810 B2
(45) Date of Patent: Sep. 7, 2021

(54) INDUCTIVE COUPLING GAP COMPENSATION

(71) Applicant: Plugless Power, Inc., Houston, TX (US)

(72) Inventors: Thomas Gattan Stout, II, Morrisville, NC (US); James Brian Normann, Holy Springs, NC (US)

(73) Assignee: Plugless Power, Inc., Houston, TX (US)

( * ) Notice: Subject to any disclaimer, the term of this patent is extended or adjusted under 35 U.S.C. 154(b) by 447 days.

(21) Appl. No.: 15/674,091

(22) Filed: Aug. 10, 2017

(65) Prior Publication Data

US 2018/0048184 A1 Feb. 15, 2018

Related U.S. Application Data

(60) Provisional application No. 62/373,856, filed on Aug. 11, 2016.

(51) Int. Cl.
*H02J 50/10* (2016.01)
*H01F 38/14* (2006.01)
(Continued)

(52) U.S. Cl.
CPC .............. *B60L 53/12* (2019.02); *H01F 27/38* (2013.01); *H01F 38/14* (2013.01); *H02J 7/0042* (2013.01);
(Continued)

(58) Field of Classification Search
CPC ......... H01F 27/38; H01F 38/14; H02J 50/10; H02J 50/12; H02J 7/0042; H02J 7/025; B60L 53/12
See application file for complete search history.

(56) References Cited

U.S. PATENT DOCUMENTS 9,156,364 B2 10/2015 Miller et al.
2014/0125140 A1* 5/2014 Widmer ................ B60L 53/122
307/104
(Continued)

FOREIGN PATENT DOCUMENTS

CN 203381512 U 1/2014
CN 104795872 A 7/2015
(Continued)

OTHER PUBLICATIONS

Bloom et al., "Design Considerations for Wireless Electric Vehicle Charging", Transportation Electrification Conference and Expo (ITEC), Date of Conference, Jun. 16-19, 2013, IEEE, 6 pages (2013).
(Continued)

*Primary Examiner* — Toan T Vu
*Assistant Examiner* — Elim Ortiz
(74) *Attorney, Agent, or Firm* — Brian M. Gaff, Esq.

(57) ABSTRACT

A first inductive element including a plurality of first subcoils, each first subcoil characterized at least in part by a geometry that comprises a winding direction and a physical size is provided. The plurality of first subcoils are in electrical communication with each other, and the geometry of each first subcoil is selected to reduce a variation in an inductive coupling between the first inductive element and a second inductive element when a gap between the first inductive element and the second inductive element varies. A method of inductive alignment using the above system is also provided.

16 Claims, 4 Drawing Sheets

(51) Int. Cl.
*B60L 53/12* (2019.01)
*H02J 50/12* (2016.01)
*H01F 27/38* (2006.01)
*H02J 7/00* (2006.01)
*H02J 7/02* (2016.01)

(52) U.S. Cl.
CPC .............. *H02J 7/025* (2013.01); *H02J 50/10* (2016.02); *H02J 50/12* (2016.02)

(56) References Cited

U.S. PATENT DOCUMENTS

| | | | |
|---|---|---|---|
| 2014/0217966 A1 | 8/2014 | Schneider et al. | |
| 2014/0327391 A1* | 11/2014 | Niederhauser | H01F 38/14 320/108 |
| 2015/0001950 A1* | 1/2015 | Chung | H01F 38/14 307/104 |
| 2015/0145340 A1* | 5/2015 | Chiyo | H01F 27/38 307/104 |
| 2015/0217655 A1 | 8/2015 | Sankaran et al. | |

FOREIGN PATENT DOCUMENTS

| | | |
|---|---|---|
| CN | 204706904 U | 10/2015 |
| CN | 205335927 U | 6/2016 |
| KR | 101220809 B1 | 1/2013 |
| WO | WO 2014/139455 A1 | 9/2014 |

OTHER PUBLICATIONS

Imura and Hori, "Maximizing Air Gap and Efficiency of Magnetic Resonant Coupling for Wireless Power Transfer Using Equivalent Circuit and Neumann Formula", IEEE Transactions on Industrial Electronics, vol. 58, Issue 10, pp. 4746-4752 (2011) pre-publication manuscript, 7 pages, received for publication on Jan. 21, 2011.

Kalwar et al., "Inductively coupled power transfer (ICPT) for electric vehicle charging—A review", Renewable and Sustainable Energy Reviews, vol. 47, pp. 462-475 (2015).

Kato et al., "New Characteristics Analysis Considering Transmission Distance and Load Variation in Wireless Power Transfer via Magnetic Resonant Coup ling", Telecommunications Energy Conference (INTELEC), 2012 IEEE, 34th International, Date of Conference, Sep. 30, 2012 to Oct. 4, 2012, IEEE, 5 pages (2012).

Li and Mi, "Wireless Power Transfer for Electric Vehicle Applications", IEEE Journal of Emerging and Selected Topics in Power Electronics, vol. 3, No. 1, pp. 4-17 (2015).

Lu et al., "Wireless Charging Technologies: Fundamentals, Standards, and Network Applications", IEEE Communications Surveys & Tutorials, vol. 18, Issue 2, pp. 1413-1452 (2016) pre-publication manuscript, 40 pages, received for publication on Nov. 14, 2015.

Vilathgamuwa and Sampath, "Wireless Power Transfer (WPT) for Electric Vehicles (EVs)—Present and Future Trends", *Plug in Electric Vehicles in Smart Grids, Integration Techniques*, Rajakaruna et al., Eds., Springer Science + Business Media, pp. 33-60 (2015).

* cited by examiner

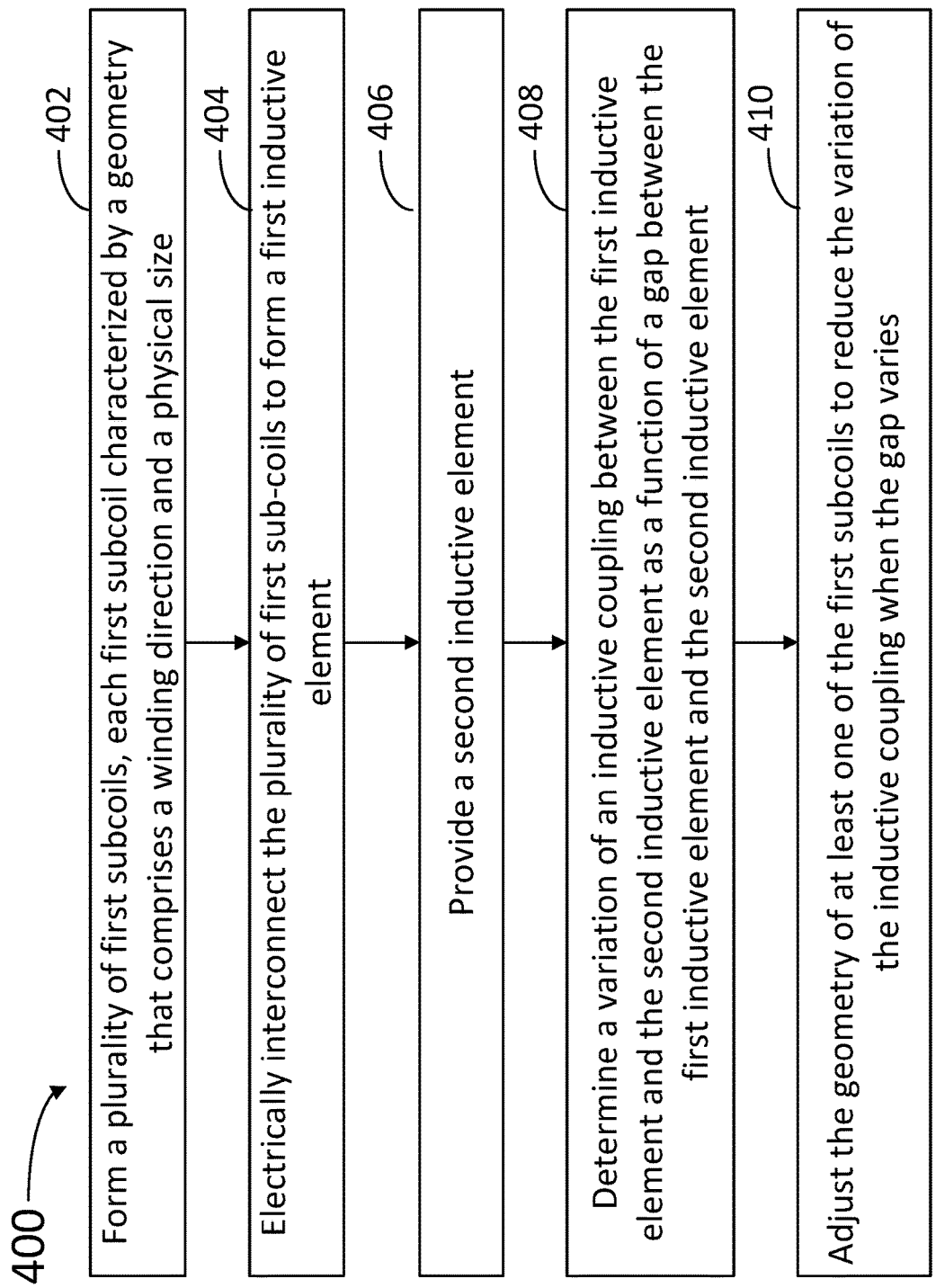

INDUCTIVE COUPLING GAP COMPENSATION

CROSS-REFERENCE TO RELATED APPLICATIONS

The present disclosure is related and claims priority to U.S. Provisional Pat. Appl. No. 62/373,856, entitled INDUCTIVE Z-AXIS COUPLING COMPENSATION, to Thomas G. Stout, and James B. Normann, filed on Aug. 11, 2016, the contents of which are hereby incorporated by reference in their entirety, for all purposes.

BACKGROUND

Field of Disclosure

Embodiments described herein are generally related to the field of wireless powering of electronic devices. More specifically, embodiments described herein are related to systems and methods for compensating an inductive coupling variation with respect to a gap variation between a primary inductor and a secondary inductor in a wireless powering configuration. One or more of these embodiments may be employed to transfer power to a vehicle from a base charging system.

Related Art

Current systems for wireless power transfer into mobile electronic appliances have wide variability in total power efficiency over the charging configuration geometry. For example, the inductive coupling between two inductive elements, each having a single coil, may vary by a factor of two or more over a span of about two inches for the gap between the two inductive elements. This inductive coupling variability is compensated by adjusting the current settings in the electric inverter supplying AC power for the primary inductive element, typically resulting in higher losses when the inductive coupling is reduced with distance.

SUMMARY

In one embodiment, a first inductive element includes a plurality of first subcoils, each first subcoil characterized at least in part by a geometry that comprises a winding direction and a physical size. The plurality of first subcoils are in electrical communication with each other, and the geometry of each first subcoil is selected to reduce a variation in an inductive coupling between the first inductive element and a second inductive element when a gap between the first inductive element and the second inductive element varies.

In another embodiment, a method of optimizing inductive coupling includes forming a plurality of first subcoils, each first subcoil characterized at least in part by a geometry that comprises a winding direction and a physical size. The method includes electrically interconnecting the plurality of first subcoils to form a first inductive element, providing a second inductive element, and determining a variation of an inductive coupling between the first inductive element and the second inductive element as a function of a gap between the first inductive element and the second inductive element. The method also includes adjusting the geometry of at least one of the first subcoils to reduce the variation of the inductive coupling when the gap varies.

BRIEF DESCRIPTION OF THE DRAWINGS

FIG. 4 is a flow chart illustrating steps in a method for inductive coupling, according to some embodiments.

In the figures, elements and steps denoted by the same or similar reference numerals are associated with the same or similar elements and steps, unless indicated otherwise.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

A wireless inductively coupled power transfer system typically includes a primary coil and a secondary coil. A traditional coil in the system is wound as a single spiral of wire, with each turn being concentric and each turn going in the same direction (e.g. clockwise or counterclockwise). In some embodiments consistent with the present disclosure, a single coil can be constructed from what is conceptually a plurality of subcoils where the winding directions are not all the same. A small diameter coil couples well at small gaps, but the inductive coupling with the primary inductor that wirelessly provides an AC power typically drops off quickly as the gap is increased. A larger diameter coil couples better across the full range (i.e. the inductive coupling does not fall off as quickly with increased gap), but will have a lower coupling coefficient at small gaps. Subcoils comprising the primary coil that are described as "large" are larger than the secondary coil. Conversely, subcoils comprising the primary coil that are described as "small" are smaller than the secondary coil. Similarly, subcoils comprising the secondary that are described as "large" or "small" are larger or smaller, respectively, than the primary coil.

Figure 1:
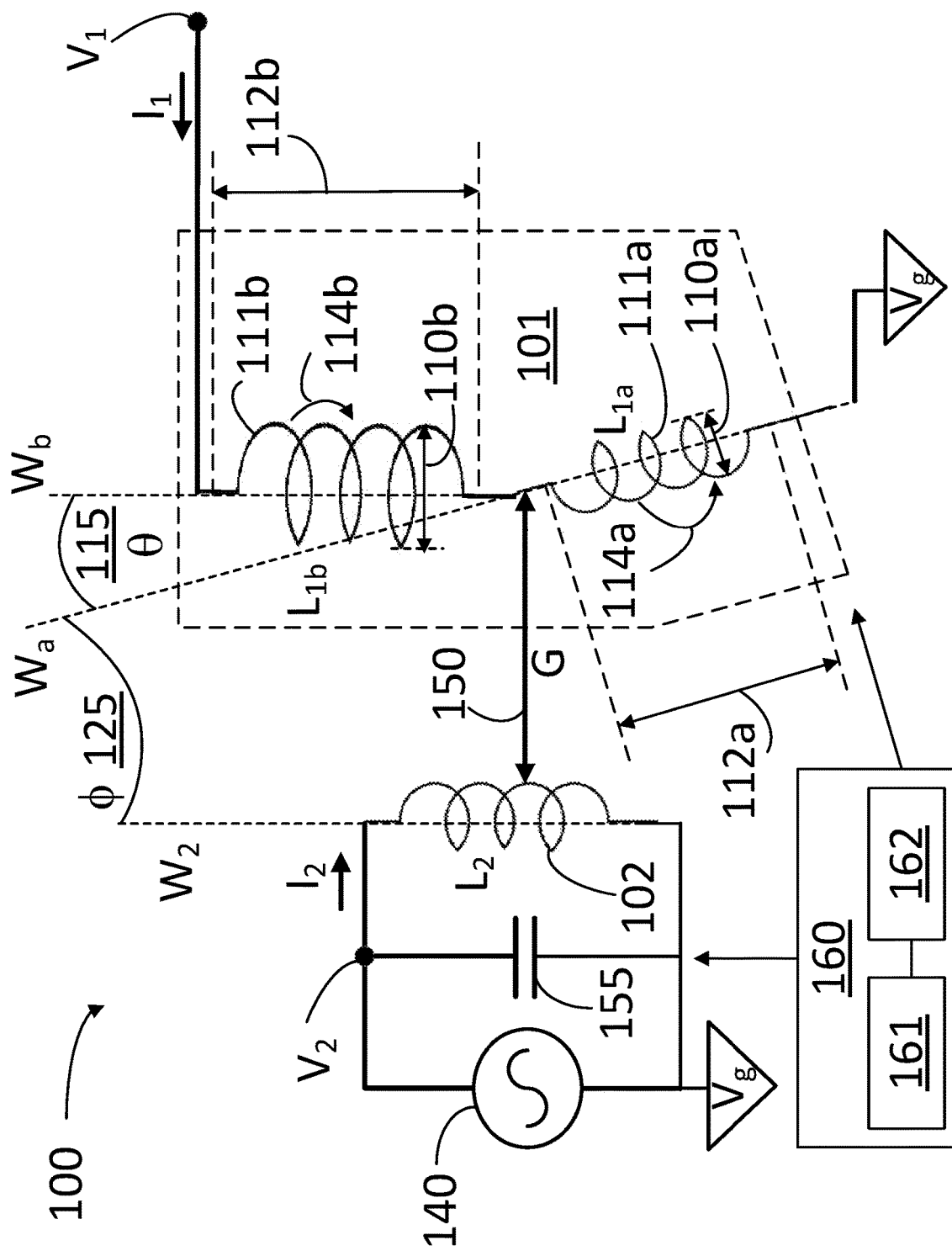
FIG. 1 illustrates an inductive wireless charging system including a first inductive element and a second inductive element having a mutual inductance M there between, according to some embodiments.

FIG. 1 illustrates an inductive wireless charging system 100 including a first inductive element 101, having inductance, $L_1$, and a second inductive element 102, having inductance, $L_2$. First inductive element 101 and second inductive element 102 may electromagnetically interact through a mutual inductance, M, therebetween, according to some embodiments. Charging system 100 may include a configuration where a source 140, coupled to second inductive element 102 (e.g., via an inverter circuit), would typically provide power to a remote electronic device, e.g., charge a battery for an electric vehicle that includes first inductive element 101 at a voltage, $V_1$, and generating a current, $I_1$.

First inductive element 101 includes subcoils 111a and 111b (hereinafter, collectively referred to as "subcoils 111"). Subcoils 111 are in electrical communication with each other. Subcoil 111a may be associated with an inductance, $L_{1a}$, and subcoil 111b may be associated with an inductance, $L_{1b}$, so that, in some embodiments, $L_1=L_{1a}+L_{1b}$ (e.g., when subcoils 111 are interconnected in series as in system 100). In some embodiments, $L_1$ and $L_{1a}$, and $L_{1b}$ are related as: $1/L_1=1/L_{1a}+1/L_{1b}$ (e.g., when subcoils 111 are interconnected in parallel). More generally, the relation between $L_1$, $L_{1a}$, $L_{1b}$, and any other inductance from an additional subcoil 111 in first inductive element 101 may depend on the specific electric coupling between subcoils 111, and also on a fixed, relative angle θ 115 formed between axis $W_a$ of subcoil 111a and axis $W_b$ of subcoil 111b, respectively.

Subcoils 111 may include a plurality of substantially concentric loops of an electrically conductive material (e.g., a conductive wire). In some embodiments, subcoils 111 are interconnected in series. In some embodiments, subcoils 111 are interconnected in parallel. Subcoils 111 also have a physical size that may be defined by a diameter 110a and 110b (hereinafter, collectively referred to as "diameter 110") and a thickness 112a and 112b (hereinafter, collectively referred to as "thickness 112"). Further, each subcoil 111 may be characterized by a geometry that comprises a winding direction 114a and 114b (e.g., counterclockwise or clockwise) and a physical size such as diameter 110 or thickness 112. The geometry of subcoils 111 may include a number of loops, $N_a$, and $N_b$, in each subcoil.

In some embodiments, second inductive element 102 includes a plurality of subcoils characterized in a similar manner as subcoils 111 in first inductive element 101. Source 140 generates a voltage $V_2$, and a current $I_2$ flowing through second inductive element 102, at a frequency, ω. Voltage $V_2$ and current $I_2$ generate AC voltage $V_1$ and AC current $I_1$ through first inductive element 101, due to the mutual inductance factor, M. Accordingly, voltages $V_1$ and $V_2$ may satisfy the following expressions:

$$V_1 = j\omega(L_1 \cdot I_1 + M \cdot I_2) \quad (1.1)$$

$$V_2 = j\omega(M \cdot I_1 + L_2 \cdot I_2) \quad (1.2)$$

System 100 may include a capacitor 155 that introduces a resonant behavior in the inductive coupling of second inductive element 102 and first inductive element 101. Accordingly, for high ω relative to 1/C (where the impedance is 1/ωC), primary coil 101 is substantially shorted down to ground voltage, $V_g$ (e.g., zero). Assuming $V_g=0$, under high frequency conditions, then, $V_2$ is shorted down to zero and the following is true:

$$I_2 = \frac{-M \cdot I_1}{L_2} \quad (2)$$

And using Eq. (2) into Eq. 1.1:

$$V_1 = j\omega\left(L_1 \cdot I_1 - \frac{M^2 I_1}{L_2}\right) = I_1 \cdot j\omega\left(L_1 - \frac{M^2}{L_2}\right) \quad (3)$$

By analogy with Eqs. 1.1 and 1.2, an effective inductance $L_s$ may be defined as:

$$L_s = L_1 - \frac{M^2}{L_2} \quad (4)$$

Wherein $$V_1 = I_1 \cdot j\omega \cdot L_s \quad (5)$$

Accordingly, $L_s$ may be interpreted as the inductance measured across $L_1$ when second inductor 102 is shorted (e.g., at high frequencies, ω). From Eq. 4, the value of the mutual inductance, M, may be found as:

$$M = \sqrt{L_2 \cdot (L_1 - L_s)} \quad (6)$$

A unit-less coupling coefficient, k, may be further defined as:

$$k = \frac{M}{\sqrt{L_1 \cdot L_2}} = \sqrt{\left(1 - \frac{L_s}{L_1}\right)} \quad (7)$$

Measurement of $L_s$ when second inductive element 102 is shorted, together with prior knowledge of $L_2$ and $L_1$, gives a measure of coupling coefficient, k. The coupling coefficient, k, is a unit-less value between 0 and 1, which is dependent on the geometry of each of subcoils 111, the configuration between subcoils 111 themselves, and the configuration of each subcoil 111 relative to second inductive element 102. In some embodiments, the geometry of subcoils 111 may include a size (e.g., diameter 110 and thickness 112). The configuration between subcoils 111 themselves may include a relative winding direction between the subcoils (e.g., coil 111-1 wound clockwise, and coil 111-2 wound counter-clockwise) and the value of fixed angle θ 115. The configuration between subcoils 111 relative to second inductive element 102 includes the value of gap 150 (G) and the value of an angle φ 125 between the axes of first inductive element 101 and second inductive element 102 ($W_a$ and $W_2$, respectively). In some embodiments, the geometry of subcoils 111 is selected to reduce a variation in the coupling coefficient, k, between first inductive element 101 and second inductive element 102 when G 150 varies, or when φ 125 varies. Likewise, in embodiments where second inductive element 102 includes a plurality of subcoils, the geometry of each subcoil in the second inductive element 102 may be selected to reduce the variation in the inductive coupling between the first inductive element and the second inductive element when G 150 or φ 125 vary.

In some embodiments, and to a first order approximation, it is desirable to express the inductive coupling, k, between first inductive element 101 and second inductive element 102 as a linear combination of two inductive coupling coefficients $k_a$ and $k_b$. Accordingly, inductive coupling $k_a$ may be an inductive coupling between subcoil 111a and second inductive element 102. Likewise, inductive coupling $k_b$ may be an inductive coupling between subcoil 111b and second inductive element 102. In such embodiments, an expression for inductive coupling, k, between first inductive element 101 and second inductive element 102 may be given by the following mathematical equation $$k(G,\varphi) = C_a k_a(G,\varphi) + C_b k_b(G,\varphi) \quad (8)$$

Where $C_a$ and $C_b$ are constants whose value depends on intrinsic properties of each of subcoils 111a and 111b, respectively, and their relative configuration (e.g., angle θ 115). In some embodiments, the intrinsic properties of each of subcoils 111a and 111b may include the inductance of each subcoil 111, separately (e.g., $L_a$ and $L_b$). For example, the value of constants $C_a$ and $C_b$ may depend on at least one of the diameter, the length, and the number of loops of each of the subcoils 111. Further, the relative ratio between constants $C_a$ and $C_b$ may depend on the relative configuration between subcoils 111. For example, the parity between constants $C_a$ and $C_b$ ($C_a$, $C_b$=+,+; +,−; −,+; −,−) may depend on the relative winding orientation between the subcoils (e.g., clockwise-clockwise, clockwise-counterclockwise, counterclockwise-clockwise, counterclockwise-counterclockwise). In some embodiments, an expression similar to Eq. 8 applies for any number of subcoils 111 in first inductive element 101, and a constant $C_i$ is associated with each subcoil, 111$i$.

As Eq. 8 indicates, coupling coefficients k, $k_a$, and $k_b$ may be functions of G 150, and of ϕ 125. More generally, $k_a$ and $k_b$ may be different functions of G 150 and of ϕ 125. The variation in the coupling coefficient, k, as a function of G 150 may be expressed from Eq. 8 as:

$$\Delta k(G,\varphi)=(C_a k'_a(G,\varphi)+C_b k'_b(G,\varphi))\cdot \Delta G \qquad (9)$$

Where $k'_a$ and $k'_b$ are first derivatives of functions $k_a$ and $k_b$ with respect to G 150. In some embodiments, it is desirable to choose the intrinsic properties (e.g., geometry and relative configuration, including θ 115) of subcoils 111 so that the values of constants $C_a$ and $C_b$ are such that $\Delta k(G, \varphi)$ is minimized for a selected range of values of gap 150 (G) and of angle ϕ 125 (cf. Eq. 9).

When G 150 changes (e.g., first inductive element 101 is displaced relative to second inductive element 102), inductive coupling, k, changes as well by an amount Δk (cf. Eq. 9). The value of Δk leads to a change in the induced voltage $V_1$, which may induce a reduction in voltage $V_2$ (e.g., when ΔG>0). However, reducing $V_2$ may be compensated by an increase the current $I_2$ to maintain a constant output power, $P_{out}=V_2 \cdot I_2$, provided by source 140. However, current $I_2$ is typically supplied by an inverter circuit having losses that are proportional to the square of the current, $I_2$. Embodiments as disclosed herein include specially designed first inductive element 101 having a plurality of subcoils 111, each with a geometry and a winding direction 114 that minimizes the variation in k over a wide range of values of G 150 and of ϕ 125.

Accordingly, in some embodiments consistent with the present disclosure, the inductive coupling, k, between inductive elements 101 and 102 may vary by a factor of about two or less, over a G 150 span of five inches, or more (e.g., a variability at least half or less of what would be expected between two traditional, single-coil inductive elements). This prevents the need to over-design the inverter coupled to source 140 to operate at high values of k, and allows for the system to run at a more consistent operating point over a broader range of configurations between first inductive element 101 and second inductive element 102. Accordingly, embodiments as disclosed herein reduce the power losses in the circuitry providing current $I_2$ to second inductive element 102 (e.g., source 140).

Wireless charging system 100 may further include a controller 160 having a processor 161 configured to execute instructions from, and receive and store data in, a memory 162. Controller 160 may communicate (e.g., wirelessly or via a wire) with first inductive element 101 and with second inductive element 102, so that when processor 161 executes instructions from memory 162, controller 160 may cause wireless charging system 100 to perform steps in a method consistent with the present disclosure. In some embodiments, controller 160 causes a charge start in wireless charging system 100 according to a detected value of G 150 or ϕ 125 (e.g., when G 150 is smaller than a first threshold, or when ϕ 125 is smaller than a second threshold), or a combination of a value of G 150 and a value of ϕ 125.

Further, in some embodiments controller 160 may cause a charge stop in wireless charging system 100 according to a detected value of G 150 or ϕ 125 (e.g., when G150 is larger than a third threshold, or when ϕ 125 is larger than a fourth threshold), or a combination of both. Further, in some embodiments controller 160 may cause wireless charging system 100 to start or stop charging according to a value of $V_1$, $V_2$, $I_1$, $I_2$, or a combination of the above. In some embodiments, processor 161 may be configured to determine a value of k, a value of Δk, or a combination of both (cf. Eqs. 8-9). Accordingly, controller 160 may cause wireless charging system 100 to start or stop charging according to the value of k, of Δk, or a combination of the two.

Figure 2:
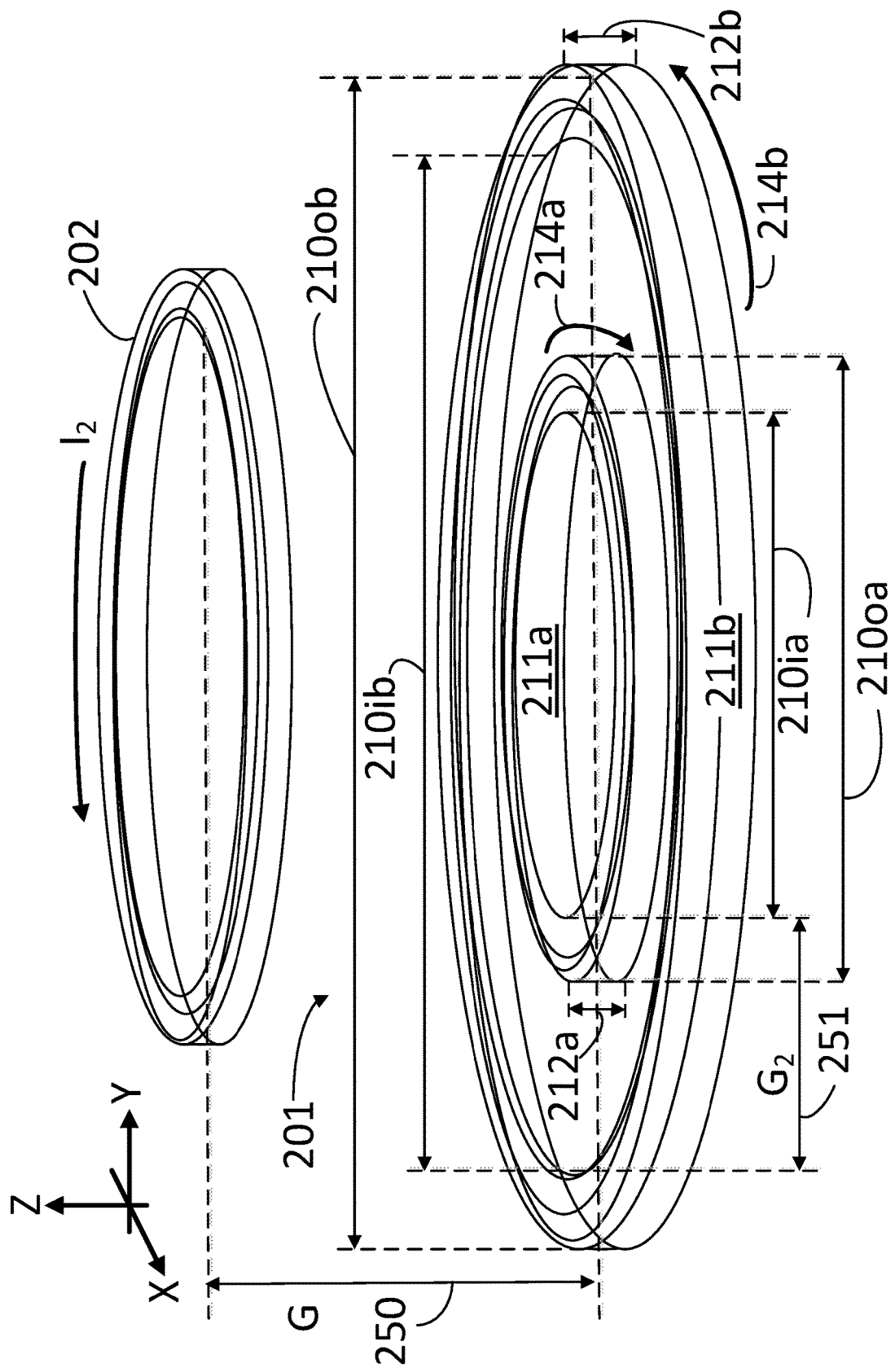
FIG. 2 illustrates a configuration between a first inductive element and a second inductive element, according to some embodiments.

FIG. 2 illustrates a configuration 200 between a first inductive element 201 and a second inductive element 202 separated by a gap G (e.g., along the Z axis) 250, according to some embodiments. In some embodiments, second inductive element 202 is configured as a primary inductor in a wireless power transfer system, receiving an alternating current (AC), $I_2$, to induce an AC voltage in first inductive element 201, which acts as a secondary inductor configured to receive power from the primary inductor (e.g., in a wirelessly re-chargeable electric appliance). First inductive element 201 includes a smaller subcoil 211$a$ and a larger subcoil 211$b$ (hereinafter, collectively referred to as "subcoils 211"). Subcoil 211$a$ has an inner diameter 210$ia$, an outer diameter 210$oa$ (hereinafter, collectively referred to as "diameters 210$a$"), a thickness 212$a$, and is wound in a clockwise direction 214$a$. Likewise, subcoil 211$b$ has an inner diameter 210$ib$ (hereinafter, collectively referred to as "diameters 210$b$"), an outer diameter 210$ob$, a thickness 212$b$, and is wound in a counter-clockwise direction 214$b$.

For example, in some embodiments subcoil 211$a$ may include 25 turns with an inner diameter 210$ia$ of about 2.5 inches, an outer diameter 210$oa$ of about 4.25 inches, and a thickness 212$a$ of about 0.25 inches. Further, in some embodiments subcoil 211$b$ may include 25 turns with an inner diameter 210$ib$ of about 9.5 inches, an outer diameter 210$ob$ of about 11.25 inches, and a thickness 212$b$ of about 0.25 inches.

By winding subcoils 211 in opposite directions, the combined effective inductive coupling, k, between first inductive element 201 and second inductive element 202, is associated with a difference between the inductive coupling between subcoil 211$a$ and second inductive element 202, $k_a$, and the inductive coupling between subcoil 211$b$ and second inductive element 202, $k_b$. Furthermore, by adjusting the number of turns in each coil the ratio Ca/Cb of inductive coupling coefficients of each of subcoils 211 with second inductive element 202 can be controlled. Accordingly, an effective inductive coupling, k, may be approximately: k=$k_b$−0.5*$k_a$ (cf. Eqs. 8-9, with $C_a$=−0.5, and $C_b$=1), wherein $k_a$ is the inductive coupling between subcoil 211$a$ and second inductive element 202, and $k_b$ is the inductive coupling between subcoil 211$b$ and second inductive element 202.

Tables 1-3 below list the results for mutual inductance (M) and inductive coupling, k(G), as a function of G 150 for the inductive coupling system illustrated in configuration 200. Without limitation, and for illustrative purposes only, the variation of G 150 in Tables 1-3 is from zero (0), to seven (7) inches.

Note that the configuration of subcoils 211 in first inductive element 201 includes a fixed gap 251 ($G_2$) between subcoil 211$a$ and subcoil 211$b$, and coplanar subcoils 211 (along an XY plane). Accordingly, in some embodiments the value of $G_2$ 251 may also be adjusted to modify coefficients $C_a$ and $C_b$ (and their relative value). For example, while subcoils 211 are shown to be concentric, some embodiments may include non-concentric subcoils 211, so that $G_2$ 251 may in fact be different around the circumference of either one of subcoils 211. Moreover, in some embodiments, subcoils 211, in addition to have different diameters 210a/210b, and different winding directions 214, may be placed in different planes.

TABLE 1

Total inductive coupling, k

| Z (inches) | Primary Inductance × $10^{-5}$ (H) (201) | Secondary Inductance × $10^{-4}$ (H) (202) | Mutual Inductance (H) × $10^{-5}$ (M) | Inductive Coupling (k) |
|---|---|---|---|---|
| 7 | 2.02 | 6.94 | 0.895 | 0.075467 |
| 6 | 2.02 | 6.94 | 1.02 | 0.085772 |
| 5 | 2.02 | 6.94 | 1.14 | 0.096533 |
| 4 | 2.02 | 6.94 | 1.27 | 0.106769 |
| 3 | 2.02 | 6.94 | 1.37 | 0.115187 |
| 2 | 2.02 | 6.94 | 1.42 | 0.119404 |
| 1 | 2.02 | 6.94 | 1.39 | 0.117647 |
| 0 | 2.02 | 6.94 | 1.32 | 0.1117 |

TABLE 2

Small subcoil 211a

| Z (inches) | Primary Inductance × $10^{-5}$ (H) (201) | Secondary Inductance × $10^{-4}$ (H) (202) | Mutual Inductance × $10^{-5}$ (H) (M) | Inductive Coupling (k) |
|---|---|---|---|---|
| 7 | 2.02 | 1.34 | 0.297 | 0.057098 |
| 6 | 2.02 | 1.34 | 0.380 | 0.073057 |
| 5 | 2.02 | 1.34 | 0.491 | 0.09437 |
| 4 | 2.02 | 1.34 | 0.639 | 0.122869 |
| 3 | 2.02 | 1.34 | 0.834 | 0.160482 |
| 2 | 2.02 | 1.34 | 1.08 | 0.208506 |
| 1 | 2.02 | 1.34 | 1.37 | 0.264079 |
| 0 | 2.02 | 1.34 | 1.62 | 0.312451 |

TABLE 3

Large subcoil 211b

| Z (inches) | Primary Inductance × $10^{-5}$ (H) (201) | Secondary Inductance × $10^{-4}$ (H) (202) | Mutual Inductance × $10^{-5}$ (H) (M) | Inductive Coupling (k) |
|---|---|---|---|---|
| 7 | 2.02 | 6.34 | 1.19 | 0.10521 |
| 6 | 2.02 | 6.34 | 1.40 | 0.123324 |
| 5 | 2.02 | 6.34 | 1.63 | 0.144373 |
| 4 | 2.02 | 6.34 | 1.90 | 0.168171 |
| 3 | 2.02 | 6.34 | 2.20 | 0.19425 |
| 2 | 2.02 | 6.34 | 2.50 | 0.220711 |
| 1 | 2.02 | 6.34 | 2.77 | 0.244385 |
| 0 | 2.02 | 6.34 | 2.95 | 0.260366 |

Figure 3:
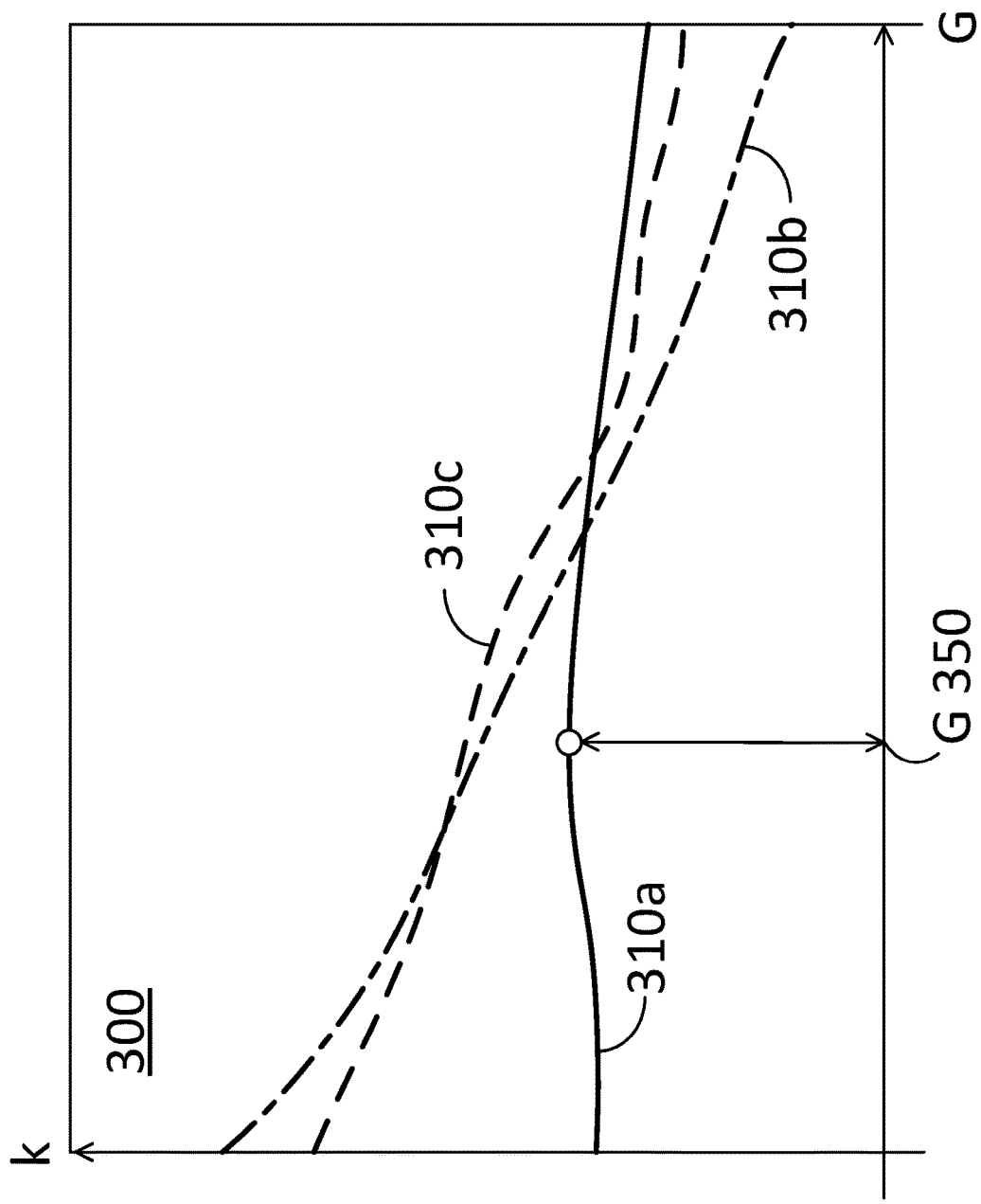
FIG. 3 illustrates a chart with graphs describing a magnetic coupling as a function of a gap between the first inductive element and the second inductive element, according to some embodiments.

FIG. 3 illustrates a chart 300 with graphs describing the inductive coupling results of configuration 200 as a function of G 150 (cf. FIG. 2 and Tables 1-3). Curve 310a corresponds to total inductive coupling, k, (cf. Table 1). Curve 310b corresponds to inductive coupling, $k_a$, (small subcoil 211a, cf. Table 2), dropping fast as a function of G 150 from a large value at G=0. Curve 310c corresponds to inductive coupling, $k_b$, (large subcoil 211b, cf. Table 3), dropping at a lower rate than the small inductive coupling, from a lower inductive coupling at G=0. Further, the variation of k for first inductive element 201 over a large range (e.g., 7 inches) is reduced compared to either subcoil 211a (small, $k_a$) and 211b (large, $k_b$), independently.

FIGS. 2 and 3 illustrate embodiments were the secondary inductor (e.g., first inductive elements 101 or 201) includes a plurality of subcoils. Furthermore, embodiments consistent with the present disclosure may include using a plurality of opposite wound coils on second inductive elements 102 or 202 (e.g., the primary inductor that supplies power), or on both the primary and secondary sides. A precise control over the coupling variance ($\Delta k$, e.g., Eq. 9) is achieved by adjusting geometries (e.g., inner/outer diameter, thickness, and relative angles) and number of turns in the subcoils. In some embodiments, a certain degree of variation $\Delta k \neq 0$ is allowed in the system. For example, in some embodiments it may be desirable to design an inverter circuit that operates over a range of current, $I_2$, from X to 2·X. In this case, a first inductive element 101, or 201 may include subcoils 111 or 211 designed and arranged so that $\Delta k/k$ is less than two (2) over a pre-selected desired gap range ($\Delta G$). In some embodiments, inductive coupling, k, generally decreases as inductive elements 101 and 102 (201 and 202, likewise) move farther away ($\Delta G > 0$). The results (cf. FIG. 3 and Table 1) verify that $\Delta k$ is substantially reduced over a wide variation in gap (no power was transferred), and that k may decrease below a certain gap value G 350.

FIG. 4 is a flow chart illustrating steps in a method 400 of optimizing inductive coupling between a first inductive element and a second inductive element, according to some embodiments. The first inductive element may be separated by a variable gap from the second inductive element, and form a variable angle between the axis of the two inductive elements (e.g., G150, G250, and ϕ 125, cf. FIGS. 1-2). Further, at least one, or both, of the first and second inductive elements may include a plurality of subcoils, each subcoil having a geometry, and a relative configuration to each other (e.g., subcoils 111 and 211). In some embodiments, the geometry of each subcoil may include a thickness, an inner diameter, an outer diameter, and a number of loops. Moreover, a relative configuration between the subcoils may include a fixed angle and a fixed gap between any two of the subcoils, and a clockwise, counter-clockwise winding direction (e.g., angle 115, gap $G_2$ 251, thickness 110, diameter 112, winding direction 114, cf. FIGS. 1 and 2).

Methods consistent with method 400 may include at least one, but not all of the steps in method 400. At least some of the steps in method 400 may be performed by a processor circuit in a controller, wherein the processor circuit is configured to execute instructions and commands stored in a memory (e.g., controller 160, processor 161, and memory 162, cf. FIG. 1). Further, methods consistent with the present disclosure may include at least some of the steps in method 400 performed in a different sequence. For example, in some embodiments a method may include at least some of the steps in method 400 performed in parallel, simultaneously, almost simultaneously, or overlapping in time.

Step 402 includes forming a plurality of first subcoils, each first subcoil characterized by a geometry that comprises a winding direction and a physical size. In some embodiments, step 402 includes winding a plurality of substantially concentric loops of an electrically conductive material for each first subcoil.

Step 404 includes electrically interconnecting the plurality of first sub-coils to form the first inductive element. In some embodiments, step 404 includes connecting at least two of the first subcoils in series. In some embodiments, step 404 includes connecting at least two of the first subcoils in parallel.

Step 406 includes providing the second inductive element. In some embodiments, step 406 includes forming a plurality of second subcoils. In some embodiments, step 406 includes winding a plurality of substantially concentric loops of an electrically conductive material for each second subcoil. Accordingly, in some embodiments step 406 includes electrically interconnecting the plurality of second subcoils. In some embodiments, step 406 includes electrically interconnecting at least two of the plurality of second subcoils in series. In some embodiments, step 406 includes connecting at least two of the plurality of second subcoils in parallel.

Step 408 includes determining a variation of an inductive coupling between the first inductive element and the second inductive element as a function of a gap between the first inductive element and the second inductive element.

Step 410 includes adjusting the geometry of at least one of the first subcoils to reduce the variation of the inductive coupling when the gap varies.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f), unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A vehicle wireless power charging system, comprising:
a controller; configured to execute instructions on a non-transitory computer-readable data storage medium;
a transfer coil apparatus, wherein the coil apparatus has minimal coupling and
minimal variation over a wide variation of a gap due to the combination of the coupling of a plurality of subcoils without adjusting current settings in an electric inverter supplying AC power;
wherein the transfer coil apparatus comprises;
a first inductive element and a second inductive element magnetically coupled together in a wireless power arrangement;
wherein each of the first inductive element and the second inductive element are comprised of a plurality of first subcoils, each first subcoil characterized by a geometry comprising a winding direction, a number of turns, and a physical size;
wherein:
the plurality of first subcoils are in electrical communication with each other, at least one first subcoil is wound in a first direction (clockwise); at least one first subcoils is wound in a second direction that is opposite to the first direction (counter-clockwise); the locations of the plurality of first subcoils are fixed relative to each other; the physical sizes of the plurality of first subcoils are fixed; the physical sizes of the plurality of first subcoils are substantially different; and the geometries of the first subcoils of the first inductive element are selected to reduce the variation in coupling between the first inductive element and the second inductive element as a function of the gap between the first inductive element and the second inductive element,
the coupling defined as $k(G,\varphi)=Ca k'a(G,\varphi)+Cb k'b(G,\varphi)$; where Ca and Cb are constants whose values depend on intrinsic properties of each of the subcoils, k is a coupling coefficient, and $\varphi$ is a value of an angle between the axes of the first inductive element and the second inductive element when planes on which the first and second inductive elements lie are substantially parallel; the centers of the first and second inductive element in the X and Y directions are at a fixed distance smaller than the largest physical size of either inductive element; a Z direction gap between the first and second inductive elements varies over a large distance; and
wherein the controller is in communication with the first inductive element and with the second inductive element.

2. The system of claim 1, wherein the first inductive element is a wireless power transmitter and the second inductive element is a wireless power receiver.

3. The system of claim 1, wherein the first inductive element is a wireless power receiver and the second inductive element is a wireless power transmitter.

4. The system of claim 1, wherein the plurality of first subcoils in the first inductive element are interconnected in series.

5. The system of claim 1, wherein the plurality of first subcoils in the first inductive element are interconnected in parallel.

6. The system of claim 1, wherein the planes on which the first inductive element and second inductive element lie are within 30 degrees of parallel.

7. The system of claim 1, wherein the geometry of each first subcoil is selected such that the variation of the inductive coupling changes by less than a factor of 2 as the Z direction gap between the first inductive element and second inductive element varies from 0% to 50% of the largest physical size of either inductive element.

8. The system of claim 1, wherein each first subcoil comprises a plurality of substantially concentric loops of an electrically conductive material.

9. The subcoil of claim 8, wherein the electrically conductive material comprises Litz wire.

10. A vehicle wireless power charging method comprising:
executing instructions, by a controller on a non-transitory computer-readable data storage medium; statically optimizing inductive coupling between first and second inductive
elements over a wide range of gaps in a wireless power transfer system without adjusting
current settings in an electric inverter supplying AC power comprising:
forming a plurality of first subcoils, each first subcoil characterized by an original geometry that comprises a winding direction, number of turns, and a
physical size; providing a second inductive element;
determining couplings between each of the first subcoils individually and the second inductive element as a function of a gap between each of the first subcoils and the second inductive element;
electrically interconnecting the plurality of first subcoils to form a first inductive element, wherein the winding directions of at least two of the plurality of first subcoils are opposite; and
communicating by the controller, with the first inductive element and the second inductive element and;
adjusting the geometry of at least one of first subcoils to achieve a reduced variation in coupling between the first inductive element and the second inductive element when the gap varies, through the wide range of gaps.

11. The method of claim 10, wherein the step of electrically interconnecting the plurality of first subcoils comprises connecting the first subcoils in series.

12. The method of claim 10, wherein the step of electrically interconnecting the plurality of first subcoils comprises connecting the first subcoils in parallel.

13. The method of claim 10, wherein the step of adjusting the geometry of at least one of the first subcoils comprises adjusting the physical size of at least one of the first subcoils.

14. The method of claim 10, wherein the step of adjusting the geometry of at least one of the first subcoils comprises adjusting the number of turns of at least one of the first subcoils.

15. The method of claim 10, wherein the step of adjusting the geometry of at least one of the first subcoils comprises adjusting a Z direction gap between the first and second inductive elements.

16. A method for vehicle wireless inductive power charging comprising:
executing instructions, by a controller on a non-transitory computer-readable data storage medium;
providing a transfer coil apparatus,
wherein the transfer coil apparatus has minimal coupling and minimal variation over a wide variation of a gap due to a combination of the coupling of a plurality of subcoils without adjusting current settings in an electric inverter supplying AC power;

wherein the transfer coil apparatus comprises:
a first inductive element and a second inductive element magnetically coupled together in a wireless power arrangement;
wherein each of the first inductive element and the second inductive element are comprised of a plurality of first subcoils, each first subcoil characterized by a geometry comprising a winding direction, a number of turns, and a physical size,
wherein:
the plurality of first subcoils are in electrical communication with each other; at least one first subcoil is wound in a first direction (clockwise); at least one first subcoil is wound in a second direction that is opposite to the first direction (counter-clockwise); the locations of the plurality of first subcoils are fixed relative to each other; the physical sizes of the plurality of first subcoils are fixed; the physical sizes of the plurality of first subcoils are substantially different; and
the geometries of the first subcoils of the first inductive element are selected to reduce the variation in coupling between the first inductive element and the second inductive element as a function of the gap between the first inductive element and the second inductive element;
the coupling defined as $k(G,\varphi)=C_a k'a(G,\varphi)+C_b k'b(G,\varphi)$; wheres Ca and Cb are constants whose values depend on intrinsic properties of each subcoils, k is a coupling coefficient, and $\varphi$ is a value of an angle between the axes of the first inductive element and the second inductive element when planes on which the first and second inductive elements lie are substantially parallel; the centers of the first and second inductive element in the X and Y directions are at a fixed distance smaller than the largest physical size of either inductive element; and a Z direction gap between the first and second inductive elements varies over a large distance; and wherein the controller is in communication with the first inductive element and with the second inductive element.

* * * * *